United States Patent
Zhu et al.

(10) Patent No.: US 11,954,106 B2
(45) Date of Patent: Apr. 9, 2024

(54) DYNAMIC DATA AGGREGATION

(71) Applicant: International Business Machines Corporation, Armonk, NY (US)

(72) Inventors: Bo Chen Zhu, Xi'an (CN); Xi Bo Zhu, Beijing (CN); Xiao Ling Chen, Beijing (CN); Cheng Fang Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/821,999

(22) Filed: Aug. 24, 2022

(65) Prior Publication Data
US 2024/0070154 A1   Feb. 29, 2024

(51) Int. Cl.
*G06F 16/00* (2019.01)
*G06F 16/23* (2019.01)
*G06F 16/2455* (2019.01)
*G06F 16/28* (2019.01)

(52) U.S. Cl.
CPC .... *G06F 16/24556* (2019.01); *G06F 16/2379* (2019.01); *G06F 16/285* (2019.01)

(58) Field of Classification Search
None
See application file for complete search history.

(56) References Cited

U.S. PATENT DOCUMENTS

2005/0055329 A1   3/2005   Bakalash

FOREIGN PATENT DOCUMENTS

CA   3118313 A1 *   5/2020   ............ G06Q 10/04

OTHER PUBLICATIONS

Le Hai Ha. Oct. 2014. Spatio-temporal Information System for the Geosciences: Concepts, Data models, Software, and Applications (Year: 2014).*
"CICS Long Running Transactions", Last Updated Jan. 21, 2022, 2 pages, <https://techdocs.broadcom.com/us/en/ca-mainframe-software/performance-and-storage/ca-sysview-performance-management/16-0/administrating/data-collection/cics-data-collection/cics-long-running-transactions.html>.
"Monitor background processes and other non-web transactions", Downloaded Jan. 31, 2022, 11 pages, <https://docs.newrelic.com/docs/apm/transactions/intro-transactions/monitor-background-processes-other-non-web-transactions/>.
"Monitoring Microsoft Azure SQL Database and Azure SQL Managed Instance performance using dynamic management views", Jan. 5, 2022, 24 pages, <https://docs.microsoft.com/en-us/azure/azure-sql/database/monitoring-with-dmvs>.

(Continued)

*Primary Examiner* — Tuankhanh D Phan
(74) *Attorney, Agent, or Firm* — Brian M. Restauro (57) ABSTRACT

Embodiments of the present invention provide computer-implemented methods, computer program products and computer systems. Embodiments of the present invention can, in response to receiving performance data associated with records, identify whether the received performance data is associated with long transactions. Embodiments of the present invention can then, in response to determining that the received performance data is associated with long transactions, storing the performance data. Embodiments of the present invention can then classify the stored performance data according to types of transactions the performance data and aggregate the stored performance data based on the classification.

19 Claims, 6 Drawing Sheets

(56) References Cited

OTHER PUBLICATIONS

Sharif, Ashraf, "Dealing with MySQL Long Running Queries", Mar. 28, 2019, 10 pages, <https://severalnines.com/database-blog/dealing-mysql-long-running-queries>.

Tai et al., "Surface and optimize slow performing queries with Datadog Database Monitoring", Aug. 17, 2021, 11 pages, <https://www.datadoghq.com/blog/database-performance-monitoring-datadog/>.

* cited by examiner

DYNAMIC DATA AGGREGATION

BACKGROUND

The present invention relates generally to the field data aggregation, and more particularly to dynamic data aggregation for long running transactions.

Typically, data aggregation is the compiling of information from databases with intent to prepare combined datasets for data processing. Some data aggregation services can compile location information (e.g., business name, address, phone number, website, description, hours of operation, etc.) These services can then validate this information using various validation methods and subsequently publish records that have been verified.

Aggregate data refers to high-level data which is acquired by combining individual-level data. For instance, the output of an industry is an aggregate of the firms' individual outputs within that industry. Aggregate data are applied in statistics, data warehouses, and in economics. Typically, aggregate data refers to individual data that are averaged by geographic area, by year, by service agency, or by other means. Aggregate data can be used to evaluate policies, recognize trends and patterns of processes, gain relevant insights, and assess current measures for strategic planning.

SUMMARY

According to an aspect of the present invention, there is provided a computer-implemented method. The computer implemented method comprises: in response to receiving performance data associated with records, identifying whether the received performance data is associated with long transactions; in response to determining that the received performance data is associated with long transactions, storing the performance data; classifying the stored performance data according to types of transactions the performance data; and aggregating the stored performance data based on the classification.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize certain deficiencies in current enterprise transaction systems. For example, in some instances, due to the large amount of the transaction executions, users cannot practically check the performance data of every transaction instance. Current solutions provide for simple aggregation data during data collection to solve this problem because it provides a fast method to retrieve the key status of running transactions. More detail can be retrieved using a data insight system. For example, a monitor agent can be used to implement this solution during the data gather (i.e., data aggregation) process. In this example, when determining whether the performance requirement is met (i.e., monitoring performance levels), the following memory calculation is used (AND/OR/AVG./MIN/MAX with mask on related bits). Even with this simple memory calculation, it is impossible to check a field of every records because when there is long running transaction in the system, embodiments of the present invention recognize the following problems that are introduced: a) the small amount of long running transaction performance data has great impact on aggregation result (e.g., MAX, AVG) and causes fake alert; and b) it will cause incorrect aggregation process due to the cross-interval time value.

Current solutions allow a user to define the profile of long running transactions. Embodiments of the present invention recognize the deficiencies of current solutions such as poor performance and missing transactions. As such, embodiments of the present invention provide solutions that improve performance and aggregate more complete data aggregation records. Specifically, embodiments of the present invention identify performance data of long running transactions, generate a mechanism to exclude the performance data of long transactions from current aggregation, store the excluded performance data in memory and subsequently retrieve the performance data that are more accurate, require less resources (e.g., less data storage), and improve data retrieval of the performance data as discussed in greater detail later in this Specification.

Figure 1:
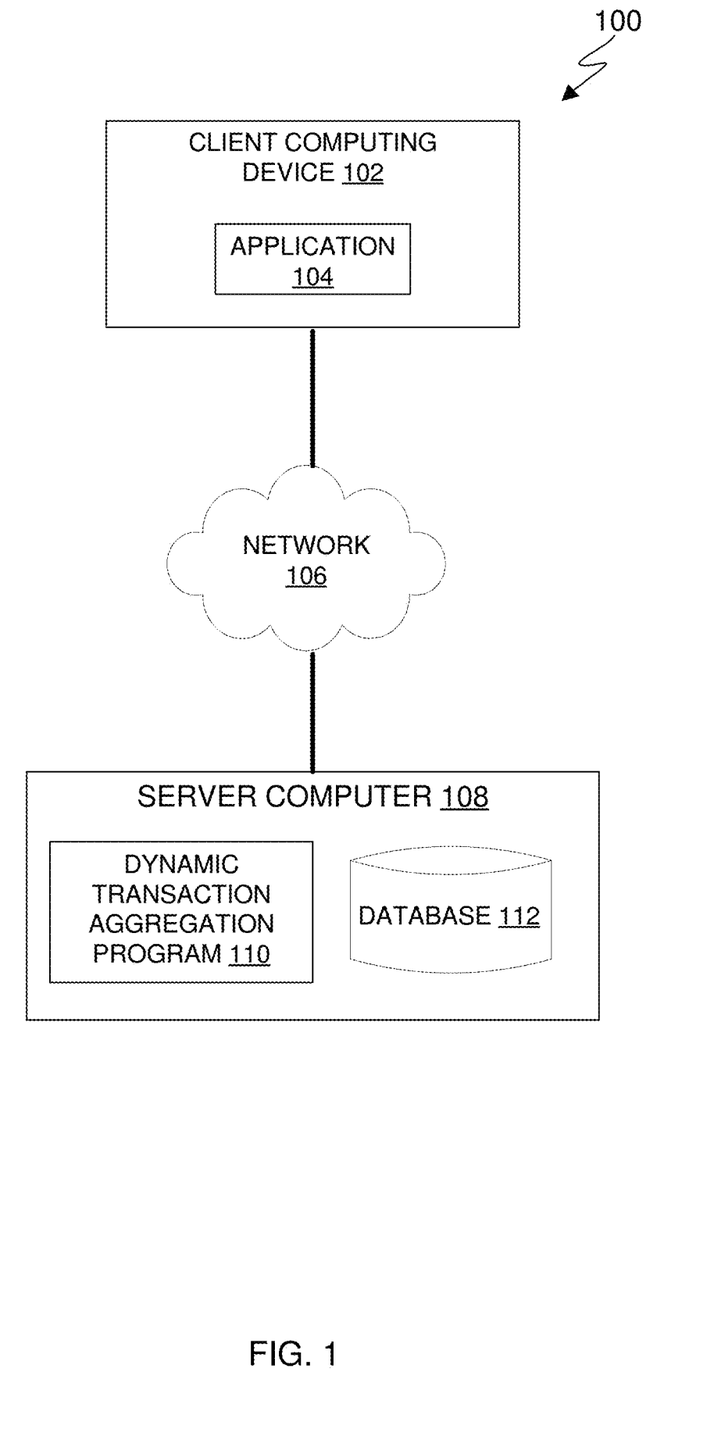
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 6.

In this embodiment, client computing device 102 is a user device associated with a user and includes application 104. Application 104 communicates with server computer 108 to access dynamic transaction aggregation program 110 (e.g., using TCP/IP) to access user information and database information. Application 104 can further communicate with dynamic transaction aggregation program 110 to generate a mechanism (e.g., an execution slot) to exclude identified performance data of long transactions from current aggregation, store the excluded performance data in memory, and subsequently retrieve the performance data, as discussed in greater detail in FIGS. 2-5. Typically, the performance data is a piece of memory and storage which has the information of some performance indicators. In memory, it is combined 0 and 1 and can be transformed and formatted to different meaning.

For example, a performance record related to CICS is:
D6013B0115EEEFCCCE000000000207000009lD
0008CDFFDCCFCDFFDCCF0000000
EE0A33190F35373932010200000C0201000E89
0160271571152715711500000030 . . . .

Typically, this performance record is unreadable for users having little to no experience on it. For monitor tool however, such data can be transformed to the ones which has the useful information on it. For example, CDFFDCCF27157115 is BP15PAA5 which is the PROC name of CICS.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts dynamic transaction aggregation program 110 and database 112. In this embodiment, dynamic transaction aggregation program 110 resides on server computer 108. In other embodiments, dynamic transaction aggregation program 110 can have an instance of the program (not shown) stored locally on client computer device 102. In other embodiments, dynamic transaction aggregation program 110 can be a standalone program or system that can be integrated in one or more computing devices having a display screen.

Dynamic transaction aggregation program 110 dynamically aggregates records for long transactions by generating a mechanism (e.g., an execution slot) to exclude identified performance data of long transactions from current aggregation, store the excluded performance data in memory, and subsequently retrieve the performance data. Long transactions, as used herein typically denote long running transactions, that is transactions that does not end in a short time. In this embodiment, dynamic transaction aggregation program 110 includes a long transaction checker that filters performance data associated with long transactions and generates an execution slot that separates that data from typical data aggregation (not shown), a record analyzer that sorts and stores the performance data by data type (not shown), and a long transaction aggregator that recommends aggregation data for long transaction based on data type (also not shown) as discussed in FIGS. 2-5.

In this embodiment, typical transaction performance data in memory typically includes a table with specified columns and rows for start and end times associated with a transaction identifier along with other measured variables. Typically, the table includes Header/Eyecatcher information that describes recorded information such as operational data (customer orders, transaction records, billing and accounting, internal statistics, etc.), transactional data (e.g., business events), analytical data (e.g., business performance), and master data (e.g., business entities) and several columns and rows that depict certain log information (e.g., data model, business glossary, master data shared domains, data cleansing, normalization, data stewardship, security constraints, dependency rules, etc.), start and end time information, reference data, and other metadata.

Examples of long transaction performance data in memory include three types of records. Type 1 records typically denote a single record associated with a single transaction. Type 2 records include multiple records each with respective transactions spanning a time period. Finally, Type 3 transactions are denoted by start and end time equals interval start and end.

In this embodiment, dynamic transaction aggregation program 110 can collect information using a data gatherer (not shown) from memory that stores transaction performance data. In this embodiment, dynamic transaction aggregation program 110 collects the raw data at configurable time intervals. In other embodiments, dynamic transaction aggregation program 110 can include a manual override to change the time interval collection period.

Dynamic transaction aggregation program 110 can then analyze the receive records and determine whether the received records and corresponding transactions are associated with long transactions. In this embodiment, dynamic transaction aggregation program 110 determines whether the received records are associated with long transaction by implementing a mechanism that filters out records that are associated with long transactions. Specifically, dynamic transaction aggregation program 110 generates a response (RESP) time mask (e.g., the mechanism) for information received in step 202. In this manner, dynamic transaction aggregation program 110 can exclude the identified performance data associated with long running transactions from current aggregation schemes.

In this embodiment, the RESP mask is a piece of 0-1 storage which stores the start and end time values a "1" and stores other fields as "0". In other embodiments, dynamic transaction aggregation program 110 can filter records that only include aggregation fields. In this embodiment, dynamic transaction aggregation program 110 identifies the start and end time and determines whether the start and end times are valid. In this embodiment, dynamic transaction aggregation program 110 determines that the start and end times are valid (e.g., fail the zero check) by identifying that the start and end time values are not zero.

In response to determining that the start and end times are not valid (e.g., pass the zero check), dynamic transaction aggregation program 110 determines that record as being associated with a long running transaction.

In response to determining that the start and end time are all valid (e.g., not zero), dynamic transaction aggregation program 110 can still determine that those records could be associated with a long transaction. In these circumstances, dynamic transaction aggregation program 110 performs a binary subtract function and checks whether it approaches the limit of statistic interval. In this embodiment, the statistic interval is a time translated binary string which refers to the system print of the performance records limit or the short/long transaction limits. In this embodiment, dynamic transaction aggregation program 110 identifies the record as going to typical data aggregation if the pass limit is not approached. In response to the record failing to pass (e.g., reaching or exceeding the limit), dynamic transaction aggregation program 110 determines the record is associated with a long transaction and is subsequently sent to a record analyzer for further investigation.

Dynamic transaction aggregation program 110 can then implement a store structure in memory to store the identified performance data associated with long running transactions. In this embodiment, dynamic transaction aggregation program 110 can implement three different store structures based on respective performance data classifications. For example, where the start and end times are not valid (e.g., having a zero value for start or end time), dynamic transaction aggregation program 110 implements a segment structure (e.g., Segment 1 discussed in greater detail with respect to FIG. 4) that contains a TID index comprising respective time intervals denoted as T1-1 . . . T1-n), respectively associated record sections and end time indexes. In instances where the RESP time is a statistic interval, dynamic transaction aggregation program 110 implements a second segment structure (e.g., Segment 2 discussed in greater detail with respect to FIG. 4) that contains a TID index containing respective time intervals denoted as T2-1 . . . T2-n, respective record sections and indexes. In instances where there are large RESP times, dynamic transaction aggregation program 110 implements a third segment structures comprising records and associated time intervals (e.g., Record T3-1 . . . Record T3-n).

Dynamic transaction aggregation program 110 can then classifies the records associated with long transactions. In this embodiment, dynamic transaction aggregation program 110 classifies the records based on record size (e.g., value) and interval end times (e.g., when there is no end time identified, and when an end time is found). In this embodiment, dynamic transaction aggregation program 110 classifies the records based on an evaluation of whether the last received record is greater than or less than the sum total of all previous records as discussed in greater detail with respect to FIG. 5.

Database 112 stores received information and can be representative of one or more databases that give permissioned access to dynamic transaction aggregation program 110 or publicly available databases. For example, database 112 can store performance data, records, transactions, etc. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2A:
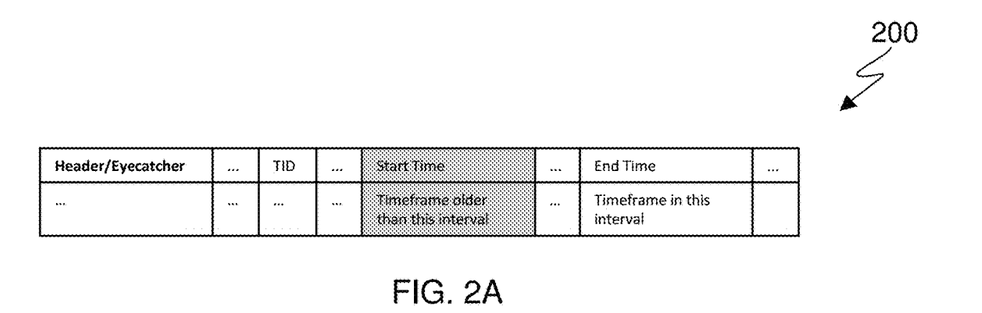
FIG. 2A depicts an example table representative of typical transaction performance data in memory, in accordance with an embodiment of the present invention.

FIG. 2A depicts an example table representative of typical transaction performance data in memory, in accordance with an embodiment of the present invention.

Table 200 depicts a typical transaction performance data that is stored in memory. In this example, table 200 is representative of a single record (e.g., type 1). Typically, the table includes Header/Eyecatcher information that describes recorded information such as operational data (customer orders, transaction records, billing and accounting, internal statistics, etc.), transactional data (e.g., business events), analytical data (e.g., business performance), and master data (e.g., business entities). and several columns and rows that depict certain log information (e.g., data model, business glossary, master data shared domains, data cleansing, normalization, data stewardship, security constraints, dependency rules, etc.), start and end time information, reference data, and other metadata. Table 200 also includes respective columns for a Transaction ID (TID) indicator Start and End Times. In this embodiment, the Start Time references a timeframe older (i.e., preceding) this interval while the End time refers to the timeframe in this interval.

Figure 2B:
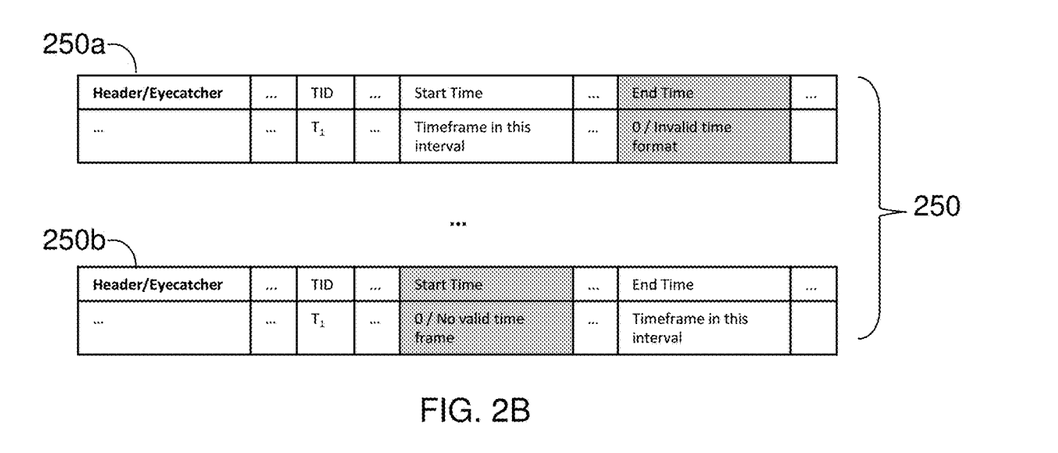
FIG. 2B depicts example tables of long transaction performance data in memory, in accordance with an embodiment of the present invention.

FIG. 2B depicts example tables of long transaction performance data in memory, in accordance with an embodiment of the present invention.

In this example, tables 250a and 250b (collectively referenced as tables 250) depict examples of long transaction performance data that is stored in memory and reflect a second type (Type 2) depicting multiple records for a long transaction representing a time interval, $T_1$. In this example, the first record (e.g., table 250a) depicted has an invalid end time because the time period has not yet elapsed for data capture. The second table (e.g., table 250b) depicted reflects a valid end time (e.g., a timeframe within the specified time period). Conversely, the second table depicted has an invalid start time due to the start time in this time interval ($T_1$) starting in the first table.

A third type (Type 3) of long transaction performance data (not shown) is represented when the start and end time equals interval start and end. Regardless, the performance data listed in each of the different types of records can be a total statistic data or data in the interval of records.

Figure 3:
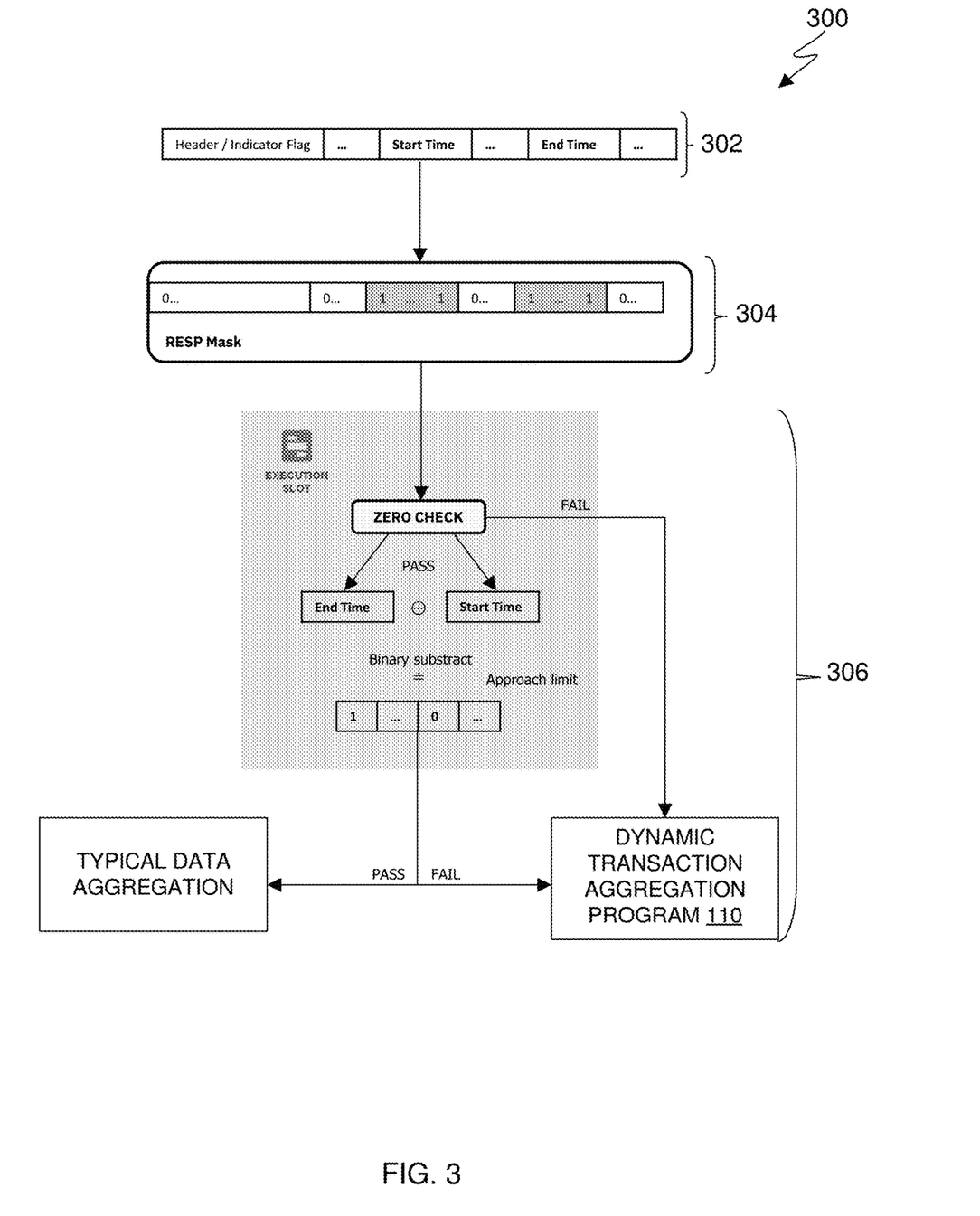
FIG. 3 depicts a block diagram of a mechanism and workflow that sorts performance data associated with long transactions, in accordance with an embodiment of the present invention.

FIG. 3 depicts a block diagram 300 of a mechanism and workflow that sorts performance data associated with long transactions, in accordance with an embodiment of the present invention.

In this example, dynamic transaction aggregation program 110 receives a new record, record 302 containing raw collected data. Dynamic transaction aggregation program 110 then masks record 302 with a RESP time mask (e.g., RESP mask 304). In other embodiments, dynamic transaction aggregation program 110 can filter records which includes only aggregation fields. As mentioned above, the RESP mask (e.g., RESP mask 304) is a piece of "0-1" storage which stores the start and end time values a "1" and stores other fields as "0".

Dynamic transaction aggregation program 110 can then determine whether the received record (i.e., raw collected data) is associated with long transactions using the RESP mask and the execution slot. In this example, dynamic transaction aggregation program 110 determines whether the received record is associated with long transactions by performing a "zero check" as part of process 306. In this embodiment, dynamic transaction aggregation program 110 performs the "zero check" by identifying whether the start and end times are valid. In response to determining that the start and end times are not valid (e.g., FAIL), dynamic transaction aggregation program 110 determines that record as being associated with a long running transaction and in need of more analysis (e.g., by a record analyzer utilized by dynamic transaction aggregation program 110).

In response to determining that the start and end time are all valid (e.g., not zero, PASS), dynamic transaction aggregation program 110 performs a binary subtract function and checks whether it approaches the limit of statistic interval. In this embodiment, the statistic interval is a time translated binary string which refers to the system print of the performance records limit or the short/long transaction limits. In this embodiment, dynamic transaction aggregation program 110 identifies the record as going to typical data aggregation (e.g., not associated with long transactions) if the pass limit is not approached. In response to the record failing to pass (e.g., reaching or exceeding the statistic limit), dynamic transaction aggregation program 110 determines the record is associated with a long transaction and is subsequently sent to a record analyzer for further investigation.

Figure 4:
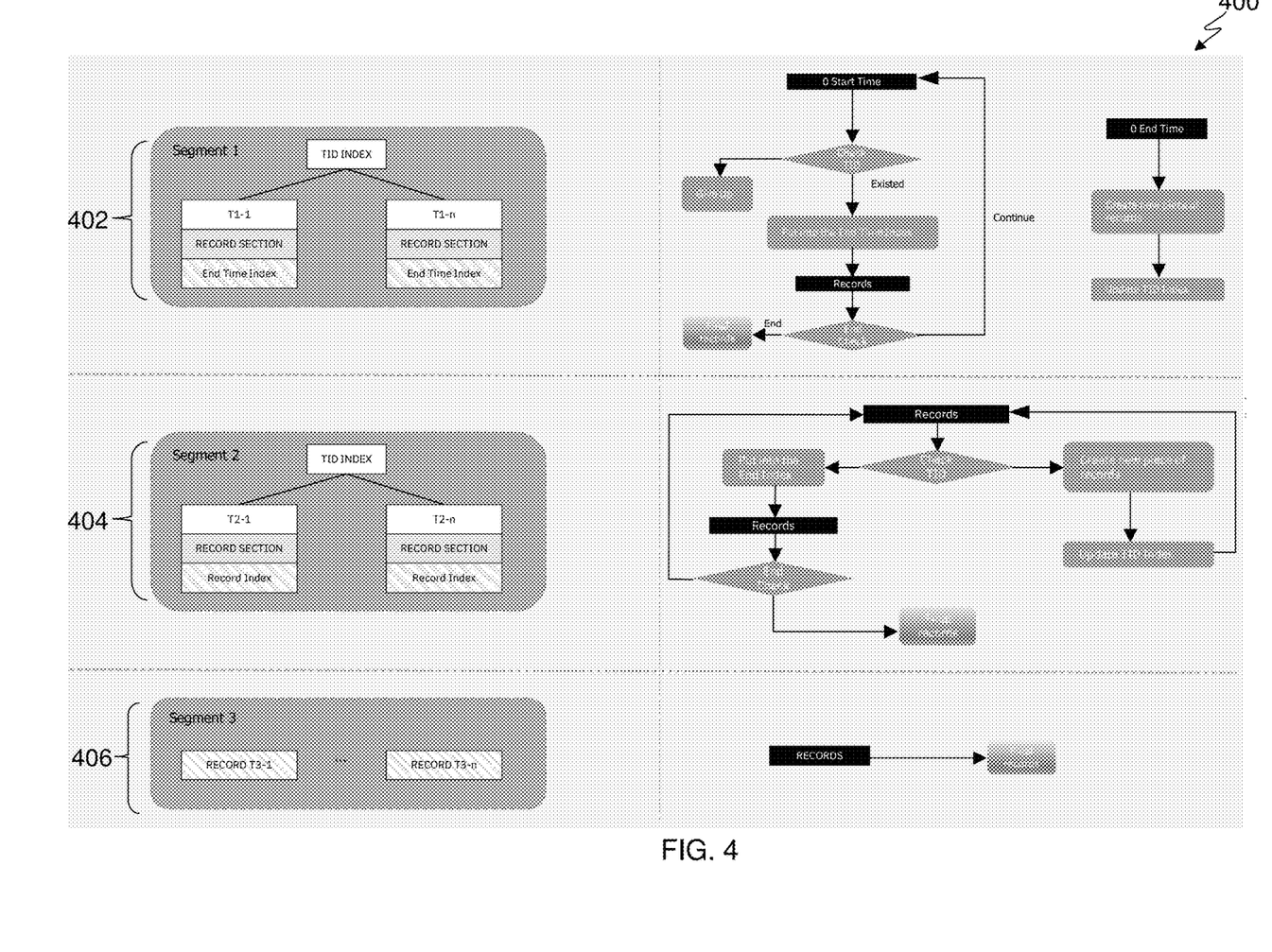
FIG. 4 depicts an example diagram for storing records associated with long transactions, in accordance with an embodiment of the present invention.

FIG. 4 depicts an example diagram 400 for storing records associated with long transactions, in accordance with an embodiment of the present invention.

In this example diagram three segments, segments 1 (e.g., record 402), segment 2 (e.g., record 404) and segment 3 (e.g., record 406) are depicted along with corresponding workflows for each received transaction for that record within a specified time interval. For example, Segment 1 for record 402 includes a respective TID index and associated records (e.g., respective record sections and an end time index for a respective transaction) and identifiers for a given interval (e.g., T1-1 . . . T1-n). In this example, segment 1 and its associated structure reflects a classification of either a "0" start time or a "0" end time. In these circumstances, dynamic transaction aggregation program 110 proceeds with the following workflow described below. For example, where the start time is "0", dynamic transaction aggregation program 110 determines whether the received record exists, that is, is associated with previously stored records. In this embodiment, dynamic transaction aggregation program 110 determines whether the received record exists by querying the TID index for a match. In response to the received record matching a record referenced in the TID index, dynamic transaction aggregation program 110 puts the received record (i.e., transaction), into the end time index and updates the record. Dynamic transaction aggregation program 110 can then perform an end check and in response to verifying that an end time interval is reached, store the received transaction into the final records. Where the end time value is "0", dynamic transaction aggregation program 110 creates new piece of records and updates the TID index.

Segment 2 for record 404 similarly includes a respective TID index and associated records (e.g., respective record sections and an end time index for a respective transaction) and identifiers for a given interval (e.g., T2-1 . . . T2-n). Dynamic transaction aggregation program 110 performs the following workflow described below in instances where the RESP time is within the statistic interval. For example, dynamic transaction aggregation program 110 can access records, determine whether the received record exists by querying the TID index for a match. In response to the received record matching a record referenced in the TID index, dynamic transaction aggregation program 110 puts the received record (i.e., transaction), into the end time index and updates the record. Dynamic transaction aggregation program 110 can then perform an end check and in response to verifying that an end time interval is reached, store the received transaction into the final records. In response to the received record not matching a record referenced in the TID index, dynamic transaction aggregation program 110 can create a new piece of record and subsequently update the TID index to reflect that update.

Segment 3 includes Records T3-1 . . . Record T3-n for a given time period. In this example, dynamic transaction aggregation program 110 performs the following workflow described below in instances where the RESP time is large, that is, exceeds the statistic interval. In this scenario, dynamic transaction aggregation program 110 stores the received transactions in its raw form.

Figure 5:
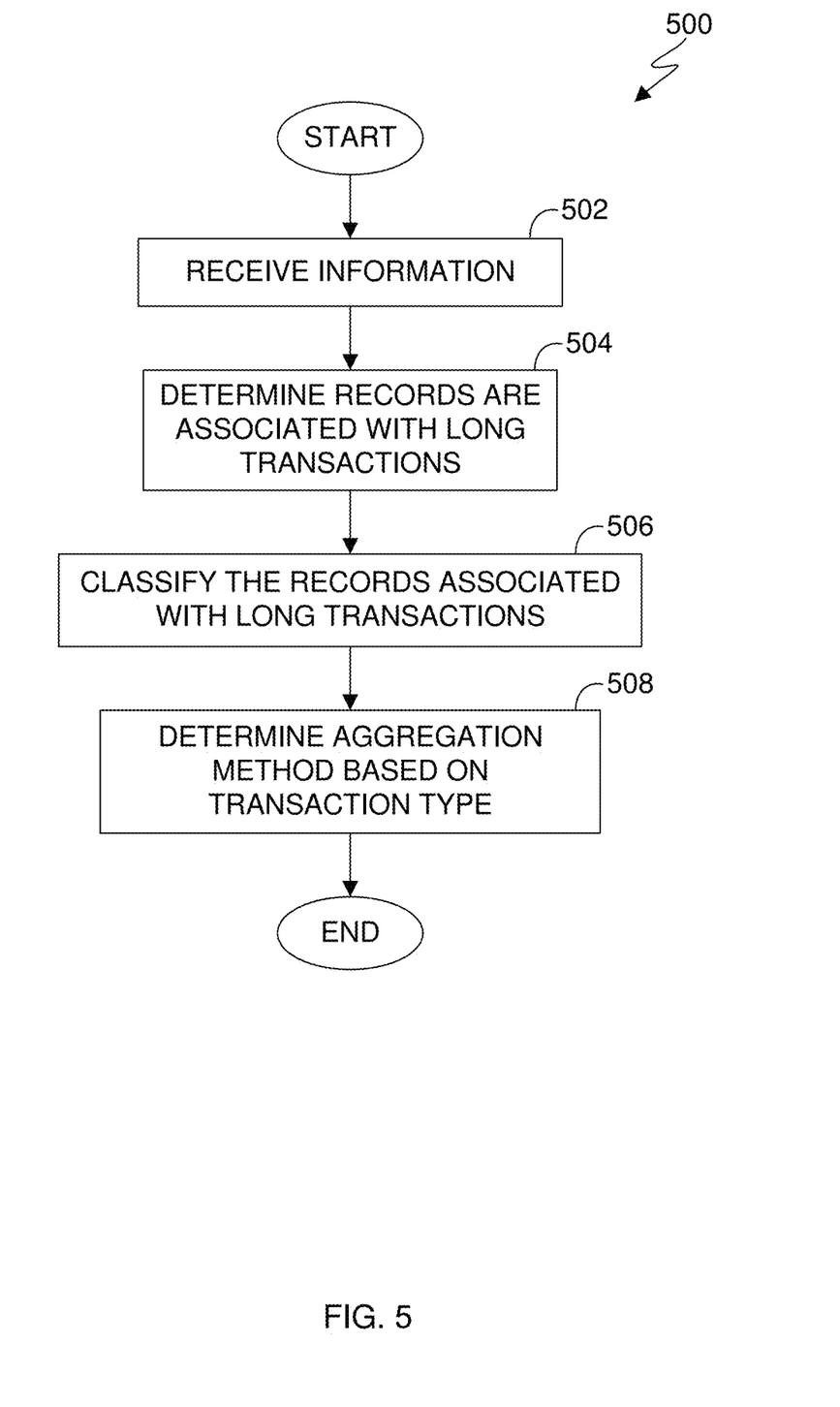
FIG. 5 is a flowchart depicting operational steps for dynamically predicting a user need, in accordance with an embodiment of the present invention.

FIG. 5 is a flowchart 500 depicting operational steps for dynamically predicting a user need, in accordance with an embodiment of the present invention, in accordance with an embodiment of the present invention.

In step 502, dynamic transaction aggregation program 110 receives information. In this embodiment, dynamic transaction aggregation program 110 receives information from one or more databases (e.g., database 112) that store performance data. Information received or otherwise accessed by dynamic transaction aggregation program 110 includes transaction performance data. Typically, transaction performance data includes a table with specified columns and rows for varying metrics. In some examples, performance data can include start and end times, and a transaction identifier. A transaction identifier can refer to a numbered tracking system as a part of an index that is used to track and classify records. Each record can include multiple transactions and each transaction can include a specific transaction identifier and respective metadata. Transaction performance data can also include values that specify the type of transaction being performed or other unique identifiers. For example, the table can include "Header/Eyecatcher" information that describes recorded information such as operational data (customer orders, transaction records, billing and accounting, internal statistics, etc.), transactional data (e.g., business events), analytical data (e.g., business performance), and master data (e.g., business entities). Examples of long transaction performance data in memory include three types of records. Type 1 records typically denote a single record associated with a single transaction. Type 2 records include multiple records each with respective transactions spanning a time period. Finally, Type 3 transactions are denoted by start and end time equals interval start and end.

For example, dynamic transaction aggregation program 110 can receive records of a new transaction, dynamic transaction aggregation program 110 can perform a TID update and create a store unit comprising a time interval denoted as "T1-1", a record section, and an end time index. In this embodiment, a "record section" refers to a piece of memory with the length of performance data. For example, content is combined 0 to 1. An "end time index" refers to a piece of memory with the same length of record section with the end bit all 1. As new records are received, dynamic transaction aggregation program 110 can append the new records to the created unit as "new record data." The new record data refers to the record that is newly collected (e.g., current data that is received). For example, if a transaction has been issued multiple times during a collection interval, there will be multiple performance records there which will be collected 1 by 1. In this example, any subsequent record collected during that collection interval is considered a new record data.

In step 504, dynamic transaction aggregation program 110 determines which records belong to long transactions. In this embodiment, dynamic transaction aggregation program 110 determines whether the received records are associated with long transaction by implementing a mechanism that filters out records that are associated with long transactions. Specifically, dynamic transaction aggregation program 110 generates a RESP time mask (e.g., the mechanism) for information received in step 202. In this manner, dynamic transaction aggregation program 110 can exclude the identified performance data associated with long running transactions from current aggregation schemes.

In this embodiment, the RESP mask is a piece of 0-1 storage which stores the start and end time values a "1" and stores other fields as "0". In other embodiments, dynamic transaction aggregation program 110 can filter records that only include aggregation fields. In this embodiment, dynamic transaction aggregation program 110 identifies the start and end time and determines whether the start and end times are valid. In this embodiment, dynamic transaction aggregation program 110 determines that the start and end times are valid (e.g., fail the zero check) by identifying that the start and end time values are not zero.

In response to determining that the start and end times are not valid (e.g., pass the zero check), dynamic transaction aggregation program 110 determines that record as being associated with a long running transaction.

In response to determining that the start and end time are all valid (e.g., not zero), dynamic transaction aggregation program 110 can still determine that those records could be associated with a long transaction. In these circumstances, dynamic transaction aggregation program 110 can determine that records that are valid (e.g., not zero) by performing a binary subtract function and checking whether the value approaches the limit of statistic interval. As mentioned above, the statistic interval references a time translated binary string that refers to the system print of the performance records limit or the short/long transaction limits. In this embodiment, dynamic transaction aggregation program 110 identifies the record as not being associated with a long transaction (and therefore should pass through typical data aggregation) if the pass limit is not approached. In response to the record failing to pass (e.g., reaching or exceeding the limit), dynamic transaction aggregation program 110 determines the record is associated with a long transaction and is subsequently sent to a record analyzer for further investigation.

In circumstances where dynamic transaction aggregation program 110 determines that the record is associated with a long transaction, dynamic transaction aggregation program 110 implements a store structure in memory to store the records associated with long running transactions. As mentioned above, dynamic transaction aggregation program 110 can implement three different store structures based on respective performance data classifications. For example, where the start and end times are not valid (e.g., having a zero value for start or end time), dynamic transaction aggregation program 110 implements a segment 1 structure that contains a TID index comprising respective time intervals denoted as T1-1 . . . T1-n), respectively associated record sections and end time indexes. In instances where the RESP time is a statistic interval, dynamic transaction aggregation program 110 implements a second segment structure, segment 2 that contains a TID index containing respective time intervals denoted as T2-1 . . . T2-n, respective record sections and indexes. Finally, in instances where there are large RESP times, dynamic transaction aggregation program 110 implements a third segment structures comprising records and associated time intervals (e.g., Record T3-1 . . . Record T3-n).

In step 506, dynamic transaction aggregation program 110 classifies the records associated with long transactions. In this embodiment, dynamic transaction aggregation program 110 classifies the records based on record size (e.g., value) and interval end times (e.g., when there is no end time identified, and when an end time is found). In this embodiment, dynamic transaction aggregation program 110 classifies the records based on an evaluation of whether the last received record is greater than or less than the sum total of all previous records.

In instances where no end time is identified, dynamic transaction aggregation program 110 can return, for a specific TID index and associated store unit comprising a time interval denoted as "T1-1", the record section, the end time index, and append new record data (e.g., representative of new records coming in). In this example, T1-n means the records in segment 1 which has 0 start time or 0 end time. T1-1 refers to the transaction 1. T1-2 means the transaction 2. You can see in the process, if the TID is existed, the record will be applied to the existing data structure.

In instances where there is an end time identified, dynamic transaction aggregation program 110 can determine the aggregation method based on the value of the last record. For example, if the last received record is greater than the total value of all previous record, dynamic transaction aggregation program 110 aggregates all time data (e.g., for a specified time interval T1-1, return the record section and new record data).

If the last received record is not greater (e.g., less than) the total value of all previous records, dynamic transaction aggregation program 110 aggregates interval-time statistic data (e.g., for a specified time interval T1-1, return new record data.

For records classified as segment 2 (e.g., multiple records), dynamic transaction aggregation manager 110 can check values when the interval end is reached. For example, dynamic transaction aggregation manager 110 can check whether the received records (e.g., the new records coming in) are found in the Record Index (i.e., the mask of record section) and similarly check the values of New Record data and Record Section. The new record data is the record section which is newly collected. Depending on the different sections, the new record data (i.e., the record section) will be formatted with different process. Thus, the record section is the data from the collected performance record after some processes.

In response to the new record data being smaller than the record section (when the interval end is reached), dynamic transaction aggregation manager 110 can add them up and add a new record index. For example, dynamic transaction aggregation manager 110 can aggregate and create the store structure for a respective a TID index that includes: a respective time period, T1-1, associated record section, record index, and new record data.

In response to the new record data greater than or equal to the record section (i.e., a piece of memory with the length of performance data) at the interval end, dynamic transaction aggregation manager 110 adds them up, keeps this section, and then adds a new record index below. The resulting structure comprises: for a TID Index, a respective T1-1, record section, record 1 (i.e., a piece of memory with the length of performance data used to store the last largest record), and record index. Record 1 is used to store the record with last largest RESP. Because the performance data for this type of record may be statistic or accelerated, the record 1 is used to make sure that we can separate the 2 cases.

In step 508, dynamic transaction aggregation program 110 determines aggregation method based on the transaction type. As mentioned above, dynamic transaction aggregation program 110 according to record size (e.g., value) and interval end times (e.g., when there is no end time identified, and when an end time is found). Based on this classification, and in response to a query for a record, dynamic transaction aggregation program 110 can return either the record section (e.g., end time interval specified for a single record) or record 1, that is, a piece of memory with the length of performance data used to store the last largest record (e.g., for multiple records). In this manner, dynamic transaction aggregation program 110 can return records more efficiently using less resources by implementing the execution slot, store structures, and classification scheme proposed in the methodology recited above.

Figure 6:
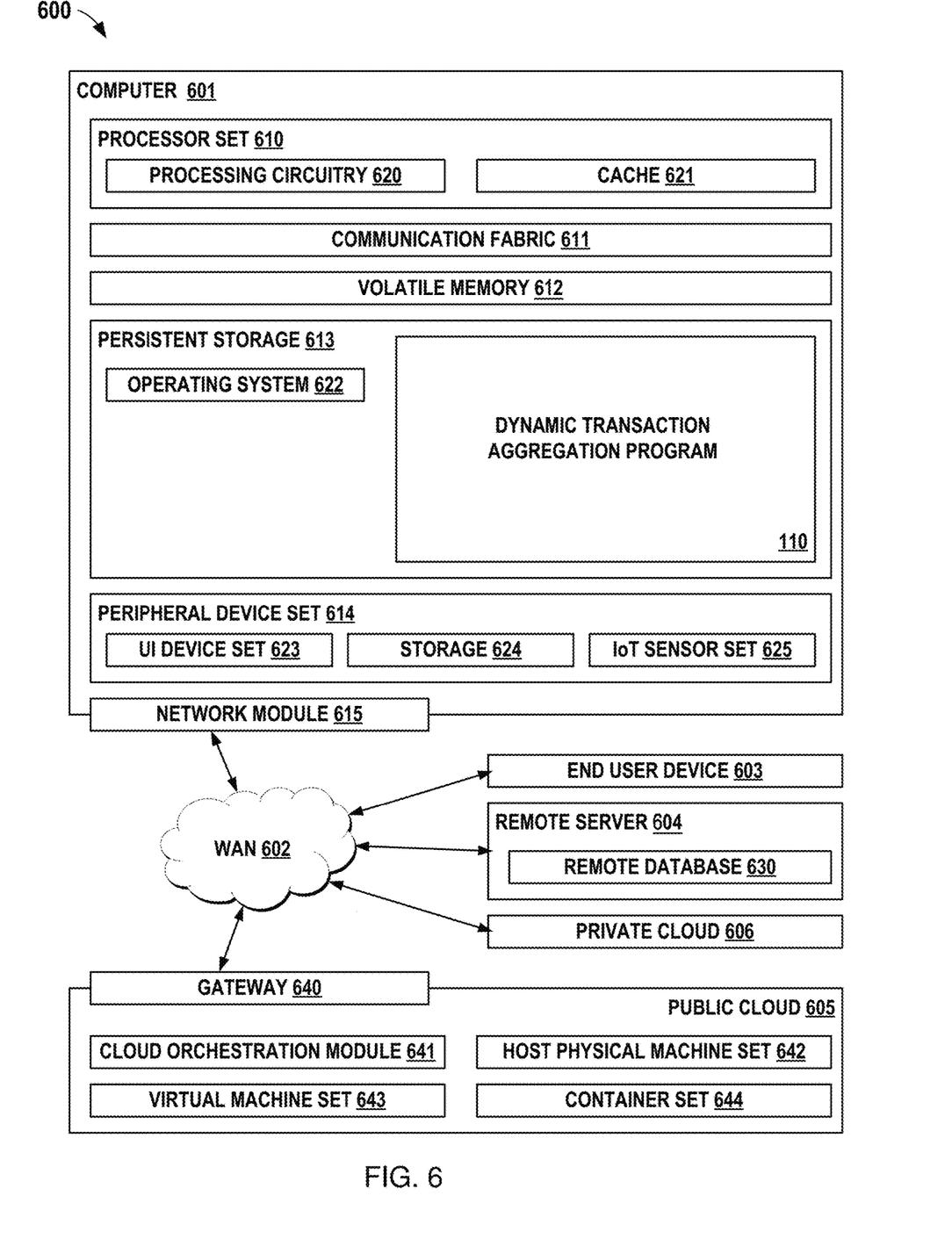
FIG. 6 is a block diagram of an alternate computing environment, in accordance with an embodiment of the present invention.

FIG. 6 depicts an alternate block diagram of components of computing systems within computing environment 100 of FIG. 1, in accordance with an embodiment of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the inventive methods, such as dynamic transaction aggregation program 110 (also referred to as block 110) dynamically aggregates records for long transactions by generating a mechanism (e.g., an execution slot) to exclude identified performance data of long transactions from current aggregation, store the excluded performance data in memory, and subsequently retrieve the performance data as discussed previously with respect to FIGS. 2-5.

In addition to block 110, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 110, as identified above), peripheral device set 614 (including user interface (UI), device set 623, storage 124, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 101, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 120 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 110 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface type operating systems that employ a kernel. The code included in block 110 typically includes at least some of the computer code involved in performing the inventive methods.

PERIPHERAL DEVICE SET 614 includes the set of peripheral devices of computer 601.

Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

What is claimed is:

1. A computer-implemented method comprising:
   in response to receiving performance data associated with records, identifying whether the received performance data is associated with long transactions by implementing an execution slot that filters performance data associated with the records that masks the performance data;
   in response to determining that the received performance data is associated with the long transactions, storing the performance data;
   classifying the stored performance data according to types of transactions of the performance data; and
   aggregating the stored performance data based on the classification.

2. The computer-implemented method of claim 1, wherein masking the performance data comprises using a RESP mask.

3. The computer-implemented method of claim 1, wherein identifying whether the received performance data is associated with long transactions comprises:
   filtering performance data associated with records to include aggregation fields only.

4. The computer-implemented method of claim 1, further comprising:
   determining whether start and end time values are valid; and
   in response to determining that the start and the end time values are not valid, identifying that the received performance data is associated with long transactions.

5. The computer-implemented method of claim 4, further comprising:
   in response to determining that the start and the end time values are valid, determining whether the start and the end time values approach a limit of statistic interval, wherein the statistic interval refers to a time translated binary string that refers to a system print performance records limits or short and long transactions limits; and
   in response to determining that the start and the end time values approach the limit of statistic interval, identifying that the received performance data is associated with long transactions.

6. The computer-implemented method of claim 1, wherein classifying the stored performance data according to types of transactions the performance data comprises:
   classifying the stored performance data based on an evaluation of whether a last received record is greater than or less than a sum total of all previous performance data associated with a record.

7. The computer-implemented method of claim 6, further comprising:
   in response to determining that the last received record is if the last received record is greater than all previous performance data associated with the record, aggregating all time performance data; and
   in response to determining that the last received record is if the last received record is less than all previous performance data associated with the record, aggregates interval-time statistic data.

8. The computer-implemented method of claim 6, further comprising:
   in response to new record data associated with the last received record being smaller than a record section for the record data, adding the new record data to the record section and creating a new record index; and
   in response to new record data associated with the last received record being greater than the record section for the record data, storing a piece of memory with a length of performance data used to store a last, largest record, and creating a new record index.

9. A computer program product comprising:
one or more computer readable storage media and program instructions stored on the one or more computer readable storage media, the program instructions comprising:
program instructions to, in response to receiving performance data associated with records, identify whether the received performance data is associated with long transactions by implementing an execution slot that filters performance data associated with the records that masks the performance data in a RESP mask;
program instructions to, in response to determining that the received performance data is associated with the long transactions, storing the performance data;
program instructions to classify the stored performance data according to types of transactions of the performance data; and
program instructions to aggregate the stored performance data based on the classification.

10. The computer program product of claim 9, wherein the program instructions to identify whether the received performance data is associated with long transactions comprise:
program instructions to filter performance data associated with records to include aggregation fields only.

11. The computer program product of claim 9, wherein the program instructions stored on the one or more computer readable storage media further comprise:
program instructions to determine whether start and end time values are valid; and
program instructions to, in response to determining that the start and the end time values are not valid, identify that the received performance data is associated with long transactions.

12. The computer program product of claim 11, wherein the program instructions stored on the one or more computer readable storage media further comprise:
program instructions to, in response to determining that the start and the end time values are valid, determine whether the start and the end time values approach a limit of statistic interval, wherein the statistic interval refers to a time translated binary string that refers to a system print performance records limits or short and long transactions limits; and
program instructions to, in response to determining that the start and the end time values approach the limit of statistic interval, identify that the received performance data is associated with long transactions.

13. The computer program product of claim 9, wherein the program instructions to classify the stored performance data according to types of transactions the performance data comprise:
program instructions to classify the stored performance data based on an evaluation of whether a last received record is greater than or less than a sum total of all previous performance data associated with a record;
program instructions to, in response to determining that the last received record is if the last received record is greater than all previous performance data associated with the record, aggregate all time performance data;
program instructions to, in response to determining that the last received record is if the last received record is less than all previous performance data associated with the record, aggregate interval-time statistic data;
program instructions to, in response to new record data associated with the last received record being smaller than a record section for the record data, add the new record data to the record section and creating a new record index; and
program instructions to, in response to new record data associated with the last received record being greater than the record section for the record data, store a piece of memory with a length of performance data used to store a last, largest record, and creating a new record index.

14. A computer system comprising:
one or more computer processors;
one or more computer readable storage media; and
program instructions stored on the one or more computer readable storage media for execution by at least one of the one or more computer processors, the program instructions comprising:
program instructions to, in response to receiving performance data associated with records, identify whether the received performance data is associated with long transactions by implementing an execution slot that filters performance data associated with the records that masks the performance data;
program instructions to, in response to determining that the received performance data is associated with the long transactions, storing the performance data;
program instructions to classify the stored performance data according to types of transactions of the performance data; and
program instructions to aggregate the stored performance data based on the classification.

15. The computer program product of claim 14, wherein the program instructions to mask the performance data comprise using a RESP mask.

16. The computer system of claim 14, wherein the program instructions to identify whether the received performance data is associated with long transactions comprise:
program instructions to filter performance data associated with records to include aggregation fields only.

17. The computer system of claim 14, wherein the program instructions stored on the one or more computer readable storage media further comprise:
program instructions to determine whether start and end time values are valid; and
program instructions to, in response to determining that the start and the end time values are not valid, identify that the received performance data is associated with long transactions.

18. The computer system of claim 17, wherein the program instructions stored on the one or more computer readable storage media further comprise:
program instructions to, in response to determining that the start and the end time values are valid, determine whether the start and the end time values approach a limit of statistic interval, wherein the statistic interval refers to a time translated binary string that refers to a system print performance records limits or short and long transactions limits; and
program instructions to, in response to determining that the start and the end time values approach the limit of statistic interval, identify that the received performance data is associated with long transactions.

19. The computer system of claim 14, wherein the program instructions to classify the stored performance data according to types of transactions the performance data comprise:
- program instructions to classify the stored performance data based on an evaluation of whether a last received record is greater than or less than a sum total of all previous performance data associated with a record;
- program instructions to, in response to determining that the last received record is if the last received record is greater than all previous performance data associated with the record, aggregate all time performance data;
- program instructions to, in response to determining that the last received record is if the last received record is less than all previous performance data associated with the record, aggregate interval-time statistic data;
- program instructions to, in response to new record data associated with the last received record being smaller than a record section for the record data, add the new record data to the record section and creating a new record index; and
- program instructions to, in response to new record data associated with the last received record being greater than the record section for the record data, store a piece of memory with a length of performance data used to store a last, largest record, and creating a new record index.

* * * * *